United States Patent
Krogh

(10) Patent No.: US 8,996,598 B2
(45) Date of Patent: Mar. 31, 2015

(54) LATENCY COMPENSATION

(75) Inventor: Steven B. Krogh, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 13/524,084

(22) Filed: Jun. 15, 2012

(65) Prior Publication Data

US 2013/0339415 A1 Dec. 19, 2013

(51) Int. Cl.
| | | |
|---|---|---|
| G06F 17/10 | (2006.01) | |
| G01S 19/15 | (2010.01) | |
| G01S 19/47 | (2010.01) | |
| G01S 19/49 | (2010.01) | |

(52) U.S. Cl.
CPC ............... G01S 19/15 (2013.01); G01S 19/47 (2013.01); G01S 19/49 (2013.01)
USPC ....................................................... 708/300

(58) Field of Classification Search
None
See application file for complete search history.

(56) References Cited

U.S. PATENT DOCUMENTS

| | | | |
|---|---|---|---|
| 6,549,829 B1 | 4/2003 | Anderson et al. | |
| 7,579,984 B2 * | 8/2009 | Wang et al. | 342/357.59 |
| 7,962,255 B2 | 6/2011 | Krogh et al. | |
| 8,134,499 B2 * | 3/2012 | Wang et al. | 342/357.3 |
| 8,774,950 B2 * | 7/2014 | Kelly et al. | 700/65 |
| 2005/0251328 A1 | 11/2005 | Merwe et al. | |
| 2007/0118286 A1 * | 5/2007 | Wang et al. | 701/213 |
| 2010/0109945 A1 | 5/2010 | Roh | |
| 2011/0066262 A1 * | 3/2011 | Kelly et al. | 700/90 |
| 2011/0169689 A1 * | 7/2011 | Wang et al. | 342/357.3 |
| 2013/0339415 A1 * | 12/2013 | Krogh | 708/316 |

OTHER PUBLICATIONS

Extended European Search Report for Application No. 13171063.4 dated May 20, 2014, 7 pages.
Moore, et al., "Future Integrated Navigation Guidance System", Proceedings of the 2001 National Technical Meeting of the Institute of Navigation, Jan. 2001, pp. 447-457.

* cited by examiner

Primary Examiner — David H Malzahn
(74) Attorney, Agent, or Firm — Toler Law Group, PC

(57) ABSTRACT

Systems and methods for latency compensation are disclosed. In one embodiment, a computer-based system for latency compensation in a dynamic system comprises a processor and logic instructions stored in a tangible computer-readable medium coupled to the processor which, when executed by the processor, configure the processor to receive at least first parameter data from a first sensor and second parameter data from a second sensor, direct the at least first parameter data and the second parameter data into a combining filter, receive additional parameter data about the dynamic system from at least one additional sensor, construct a model of latency effects on the first parameter data and the second parameter data, and use the model of latency effects to compensate for latency-based differences in the first parameter data and the second parameter data.

21 Claims, 3 Drawing Sheets

LATENCY COMPENSATION

BACKGROUND

The subject matter described herein relates to electronic computing and computer-based modeling of real world events, and more particularly to techniques for latency compensation in computer based systems that use inputs from multiple data sources to measure real world system dynamics.

Complex, dynamic systems may be modeled using inputs from multiple sensors throughout the system. By way of example, the aircraft industry has developed automatic landing capability using a differential Global Positioning System (GPS). This capability is known as the Global Navigation Satellite System Landing System (GLS). The GLS has been certified for commercial air traffic (CAT) operations. Some automatic landing systems may incorporate outputs from multiple different sensors to determine position and orientation information for an aircraft. The outputs of the different sensors may be subject to latency effects, particularly during maneuvers, which can bias results of the model.

Accordingly, systems and methods for latency compensation may find utility.

SUMMARY

Systems and methods for latency compensation are disclosed. In one embodiment, a computer-based method to for latency compensation in a dynamic system comprises receiving at least first parameter data from a first sensor and second parameter data from a second sensor, directing the at least first parameter data and the second parameter data into a combining filter, receiving additional parameter data about the dynamic system from at least one additional sensor, constructing a model of latency effects on the first parameter data and the second parameter data, and using the model of latency effects to compensate for latency-based differences in the first parameter data and the second parameter data.

In another embodiment, a computer-based system for latency compensation in a dynamic system comprises a processor and logic instructions stored in a tangible computer-readable medium coupled to the processor which, when executed by the processor, configure the processor to receive at least first parameter data from a first sensor and second parameter data from a second sensor, direct the at least first parameter data and the second parameter data into a combining filter, receive additional parameter data about the dynamic system from at least one additional sensor, construct a model of latency effects on the first parameter data relative to the second parameter data, and use the model of latency effects to compensate for latency-based differences in the first parameter data and the second parameter data.

In another embodiment, a computer program product for latency compensation in a dynamic system comprising logic instructions stored in a tangible computer-readable medium coupled to a processor which, when executed by the processor, configure the processor to receive at least first parameter data from a first sensor and second parameter data from a second sensor, direct the at least first parameter data and the second parameter data into a combining filter, receive additional parameter data about the dynamic system from at least one additional sensor, construct a model of latency effects on the first parameter data and the second parameter data, and use the model of latency effects to compensate for latency-based differences in the first parameter data and the second parameter data.

Further areas of applicability will become apparent from the description provided herein. It should be understood that the description and specific examples are intended for purposes of illustration only and are not intended to limit the scope of the present disclosure

BRIEF DESCRIPTION OF THE DRAWINGS

Embodiments of methods, systems, and computer program products in accordance with the teachings of the present disclosure are described in detail below with reference to the following drawings.

DETAILED DESCRIPTION

Systems and methods for latency compensation are described herein. Specific details of certain embodiments are set forth in the following description and figures to provide a thorough understanding of such embodiments. One skilled in the art will understand, however, that alternate embodiments may be practiced without several of the details described in the following description.

In general, the subject matter described herein relates to techniques to compensate for latency in systems which model real world events by combining inputs from multiple sensors which measure different parameters. In some embodiments the sensor parameters may be combined in a filter, e.g., a complementary filter or a Kalman filter. In many applications, such filters are designed to form an estimate of measurement error a relative bias estimate, which may be used as a correction for a measurement error, such as a bias, on one of the data sources. Various events may introduce latency between the parameters sensed by different sensors. A difference in latency for the input data sources to such filters can cause unwanted perturbations of the filter outputs, which may corrupt the relative bias estimate generated by the filter.

As described herein, the latency may be compensated by constructing a model of latency effects on the various sensors and using the model to calculate a latency compensation value for at least one of the parameters. The latency compensation value may then be applied to the parameter(s) to compensate for differences in latency between multiple sensors. In some embodiments the latency compensation system may receive feedback in the form of a latency estimate which may be used to update the model, such that the model may be refined over time with use in the real world.

Various embodiments may be implemented in the context of automatic landing systems for aircraft. By way of example, some aircraft include autopilot systems which include complementary filters which blend position inputs from GPS based sensors and gyroscopic or inertial based sensors located throughout the aircraft. When the aircraft is flying in a straight line the outputs of these sensors may be substantially coherent. However, when the aircraft maneuvers latency may be introduced into the outputs of one or more of the sensors, e.g., due to differences in position in the sensors on air aircraft or due to time differences in sampling rates. The systems and methods described herein enable autopilot systems to compensate for the errors introduced by latency in the sensors. In other embodiments the systems and methods described herein may be implemented in an inertial navigation unit or a multi-mode receiver which blends GPS position data with inertial data.

Figure 1:
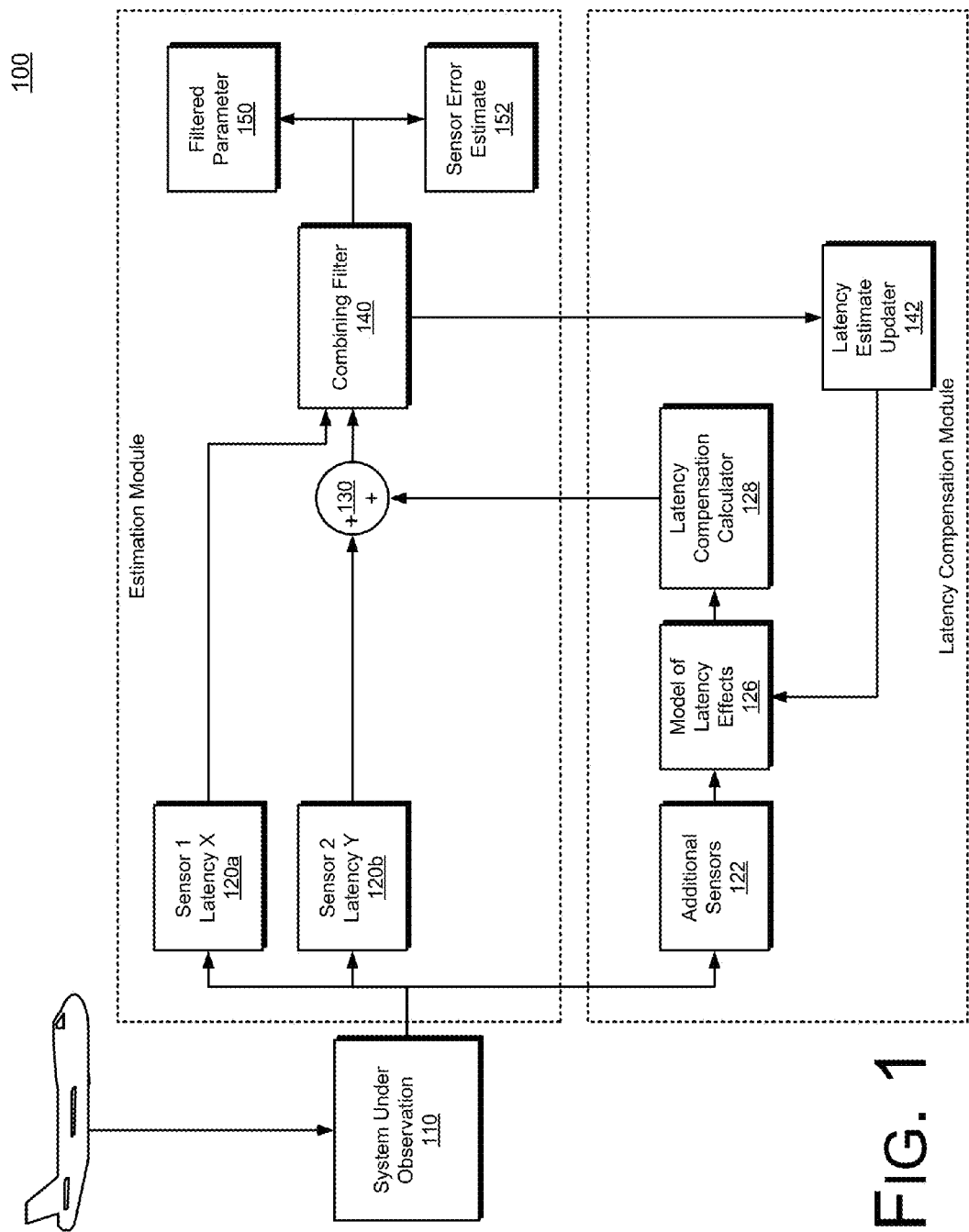
FIG. 1 is a schematic illustration of a system to implement latency compensation, according to embodiments.

FIG. 1 is a schematic illustration of a system 100 for latency compensation according to embodiments. Referring to FIG. 1, in brief overview in one embodiment a system under observation 110 may include a plurality of sensors including a first sensor 120a and a second sensor 120b which detect different parameters related to the same characteristic. Further, the system under observation 110 may include additional sensors 122 which detect different parameters related to different characteristics.

By way of example, in some embodiments the system under observation 110 may be an aircraft. In this embodiment the first sensor 120a may be a GPS based sensor and the second sensor 120b may be an inertial based sensor. Sensors 120a and 120b may be components of an automatic pilot system such as a GPS based landing system augmented with an inertial reference unit as described in U.S. Pat. No. 7,962,255 to Krogh, et al, the disclosure of which is incorporated herein by reference in its entirety. Additional sensors 122 may include sensors which detect other parameters of the aircraft, e.g., ground speed, orientation, cross-runway velocity, and the like.

The system 100 further includes a model of latency effects 126, a latency compensation calculator 128, a combining filter 140, and a latency estimate updater 142. The combining filter 140 may be implemented as a complementary filter, Kalman filter, Wiener filter, maximum likelihood estimator or other data fusion or estimation algorithm; the combining filter generates a filtered parameter output 150 and a sensor error estimate 152. In some embodiments the combining filter may be implemented as discrete logic components as described in U.S. Pat. No. 6,549,829 to Anderson, et al., the disclosure of which is incorporated herein by reference in its entirety. In other embodiments the latency compensation calculator 128 and the summer 130 may be incorporated into a Kalman filter, with the amount of latency incorporated as a Kalman state.

Figure 2:
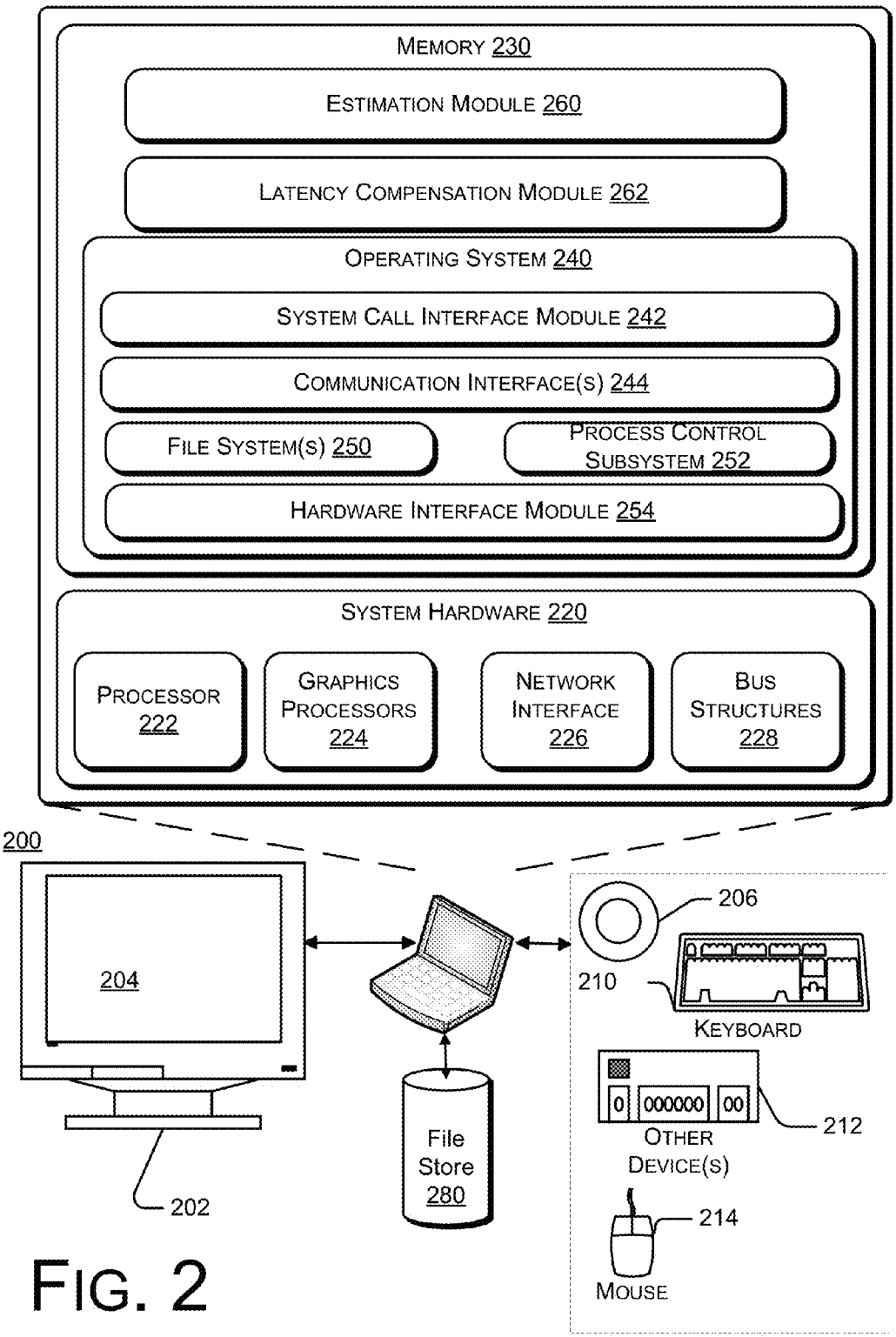
FIG. 2 is a schematic illustration of a computing device which may be adapted to implement a system and method for latency compensation in accordance with some embodiments.

In alternate embodiments one or more components of the system 100 may be implemented as logic instructions stored in a tangible computer readable medium which, may be implemented in a computer system environment. FIG. 2 is a schematic illustration of a computing device which may be adapted to implement a system and method for latency compensation in accordance with some embodiments. In one embodiment, system 200 may include one or more accompanying input/output devices including a display 202 having a screen 204, one or more speakers 206, a keyboard 210, one or more other I/O device(s) 212, and a mouse 214. The other I/O device(s) 212 may include a touch screen, a voice-activated input device, a track ball, and any other device that allows the system 200 to receive input from a user.

The computing system 200 includes system hardware 220 and memory 230, which may be implemented as random access memory and/or read-only memory. A file store 280 may be communicatively coupled to system 200. File store 280 may be internal to computing system 200 such as, e.g., one or more hard drives, CD-ROM drives, DVD-ROM drives, or other types of storage devices. File store 280 may also be external to computer system 200 such as, e.g., one or more external hard drives, network attached storage, or a separate storage network.

System hardware 220 may include one or more processors 222, one or more graphics processors 224, network interfaces 226, and bus structures 228. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 224 may function as adjunct processors that manages graphics and/or video operations. Graphics processor(s) 224 may be integrated onto the motherboard of computing system 200 or may be coupled via an expansion slot on the motherboard.

In one embodiment, network interface 226 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 228 connect various components of system hardware 228. In one embodiment, bus structures 228 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 230 may include an operating system 240 for managing operations of computing device 208. In one embodiment, operating system 240 includes a hardware interface module 254 that provides an interface to system hardware 220. In addition, operating system 240 may include a file system 250 that manages files used in the operation of computing device 208 and a process control subsystem 252 that manages processes executing on computing device 208.

Operating system 240 may include (or manage) one or more communication interfaces that may operate in conjunction with system hardware 220 to transceive data packets and/or data streams from a remote source. Operating system 240 may further include a system call interface module 242 that provides an interface between the operating system 240 and one or more application modules resident in memory 230. Operating system 240 may be embodied as a Windows® brand operating system or as a UNIX operating system or any derivative thereof (e.g., Linux, Solaris, etc.), or other operating systems.

In one embodiment, memory 230 includes an estimation module 260 which may include logic instructions encoded in a tangible computer-readable medium which, when executed by processor 222, cause the processor 222 to implement estimation operations. Similarly, the latency compensation module 262 may include logic instructions encoded in a tangible computer-readable medium which, when executed by processor 222, cause the processor 222 to implement latency compensation operations. Referring back to FIG. 1, in some embodiments the estimation module 260 corresponds to the components in the dashed box indicated as an estimation module, while the latency compensation module 262 may correspond to the correspond to the components in the dashed box indicated as a latency compensation module. In practice the two modules may be separate or may be combined into a single, integrated piece of software.

Figure 3:
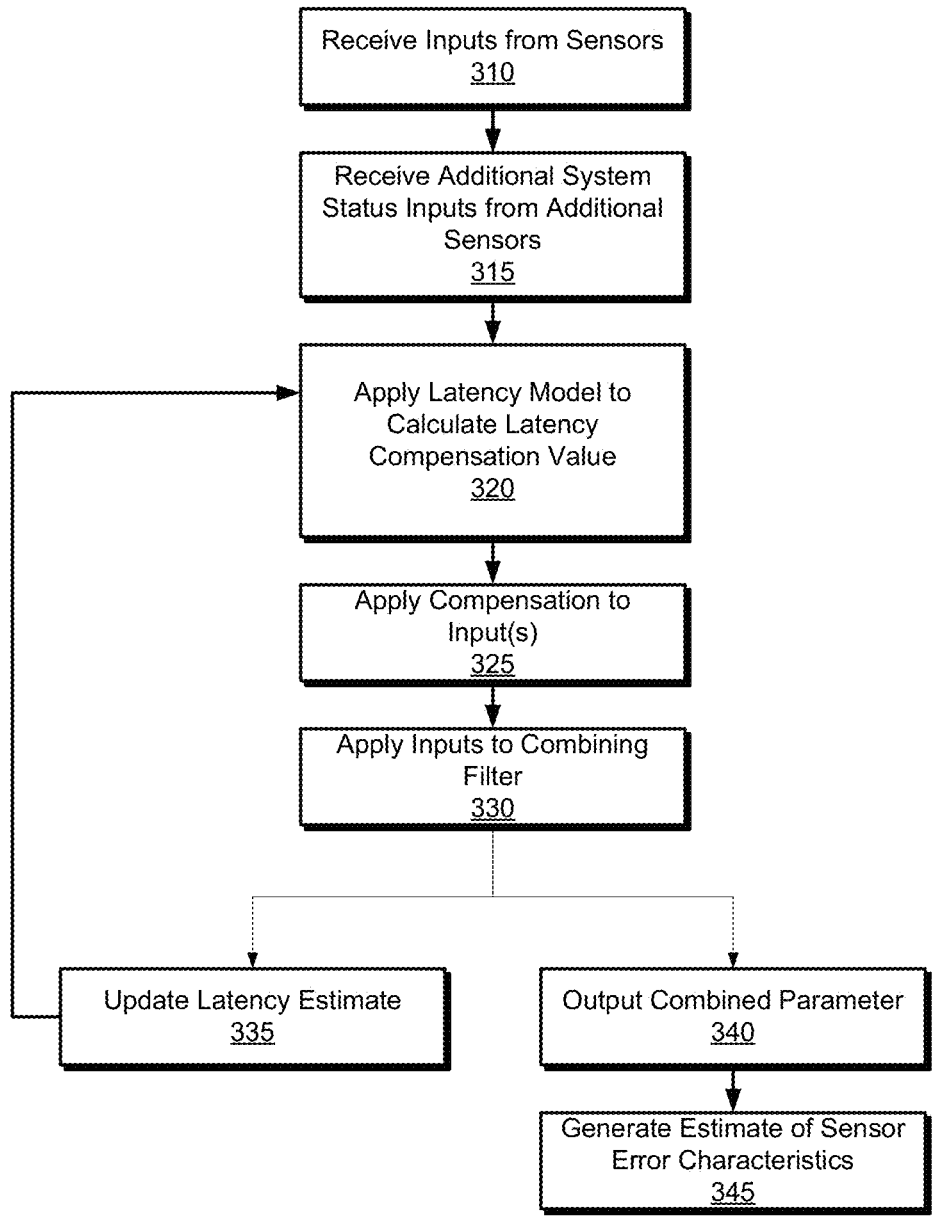
FIG. 3 is a flowchart illustrating operations in a method for latency compensation according to embodiments.

FIG. 3 is a flowchart illustrating operations in a method for latency compensation according to embodiments. Referring to FIG. 3, at operation 310 inputs are received from sensors 120a, 120b, and from additional sensors 122. In some embodiments the input from sensor 120a may correspond to a GPS based position signal, while the input from sensor 120b may correspond to an input from an inertial reference unit. At operation 315 additional system status inputs are received from additional sensors 122. As described above, in some embodiments the additional inputs may include other parameters of the aircraft, e.g., ground speed, orientation, cross-runway velocity, and the like.

At operation 320 a latency model is applied to calculate a latency compensation value for at least one of the outputs from sensors 120a or 120b. Referring briefly to FIG. 1, in some embodiments the outputs from additional sensors 122 are input into a model of latency effects 126, which in turn feeds a latency compensation calculator 128. In one embodiment the model of latency effects 126 and latency compensation calculator 128 may implement operations which determine a latency compensation factor for cross-runway velocity. The cross-runway velocity may be modeled by equation (1):

$$\text{Vel\_xrwy} = V\text{gnd} * \sin(\text{psi\_int}) \qquad \text{EQ [1]}$$

where Vel_xrwy=cross-runway velocity, Vgnd=ground speed and where psi_int is the intercept angle; that is, the difference between aircraft ground track angle and runway heading.

If the aircraft is flying in a straight line at a constant ground speed, vel_xrwy does not vary over time. If there is only a small difference in latency of GPS vs. inertial information, the combining filter 140 can still perform its intended function. The value of vel_xrwy will fluctuate in turbulence, but that fluctuation will average out over time.

However, the situation changes during a capture maneuver in which the aircraft turns from an intercept heading to follow an extension of the runway centerline. During the turn, the cross-runway velocity will be trending toward zero for a long period. If, for example, the GPS data have a greater latency than the inertial information, there will be an apparent difference between the cross-runway velocities derived from the two sources. The combining filter 140 erroneously interprets this difference as a velocity bias.

This apparent bias changes during the turn as the intercept angle changes. The apparent bias goes away as the turn is completed and centerline is captured, which requires the filter 140 to undo its estimate of the apparent velocity bias from early in the turn.

The size of the apparent velocity bias during the capture maneuver can be estimated by equation [2] as follows:

$$\text{vel\_xrwy\_bias} = \text{delay\_}kt * \text{vel\_xrwy\_dot} \qquad \text{EQ [2]}$$

where delay_kt=the size of the relative latency, and vel_xrwy_dot is the rate of change of the cross-runway velocity. Differentiating equation [1] yields equation [3], as follows:

$$\text{vel\_xrwy\_dot} = V\text{gnd\_dot} * \sin(\text{psi\_int}) + V\text{gnd} * \text{psi\_int\_dot} * \cos(\text{psi\_int}) \qquad \text{EQ [3]}$$

Substituting vel_xrwy_dot from [3] into [2] gives equation [4], as follows:

$$\text{vel\_xrwy\_bias} = \text{delay\_}kt * [V\text{gnd\_dot} * \sin(\text{psi\_int}) + V\text{gnd} * \text{psi\_int\_dot} * \cos(\text{psi\_int})] \qquad \text{EQ [4]}$$

In some embodiments the latency compensation calculator calculates the results of equation [4] and applies them (operation 325) as a latency compensation to the inertial cross-runway velocity upstream of the combining filter 140 by way of summer 130. At operation 330 the inputs from sensors 120a, 120b are applied to the combining filter 140. The latency compensation factor allows the combining filter 140 to perform its intended function through the turn of the aircraft without a disturbance to its output or corruption of its velocity bias estimate.

At operation 335 the latency estimate is updated and is provided as feedback to the model of latency effects 126. Thus, the latency compensation module is adaptive in the sense that it incorporates feedback from the current state of the combining filter 140 into the model 126.

At operation 340 the combining filter 140 generates an output from the combined parameters. The output may be provided to a control system such as, e.g., an autopilot system for an aircraft, which may implement one or more control routines based on the output. At operation 345 the combining filter 140 generates an estimate of one or more sensor error characteristics.

Thus, the structures depicted in FIGS. 1-2 and the operations depicted in FIG. 3 enable latency compensation to be implemented in a control system which uses a combining filter to combine inputs form disparate sensors. Such structures and methods may find utility in, e.g., automated control systems for aircraft.

In the foregoing discussion, specific implementations of exemplary processes have been described, however, it should be understood that in alternate implementations, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method comprising:
  receiving first parameter data at a computer system from a first sensor;
  receiving second parameter data at the computer system from a second sensor;

generating, at the computer system, a latency compensation adjustment parameter associated with the second parameter data based on additional parameter data received from an additional sensor and based on a model of latency effects;

generating, at the computer system, filtered parameters based on the first parameter data, the second parameter data, and the latency compensation adjustment parameter; and generating an output based on the filtered parameters, wherein the output is provided to an autopilot system of an aircraft.

2. The method of claim 1, wherein the additional parameter data includes a ground speed, an orientation, a cross-runway velocity, or a combination thereof.

3. The method of claim 1, wherein the filtered parameters are generated at a combining filter in the computer system.

4. The method of claim 1, further comprising:

generating a latency estimate based on the first parameter data, the second parameter data, and the latency compensation adjustment parameter; and updating the model of latency effects based on the latency estimate.

5. The method of claim 1, further comprising generating a sensor error estimate for the second sensor.

6. The method of claim 1, wherein the model of latency effects compensates for position-based differences in motion over time between the first sensor and the second sensor.

7. The method of claim 1, wherein:

the first sensor comprises an inertial measuring system; and the second sensor comprises a global positioning system (GPS) based measuring system.

8. A computer-based system for latency compensation in a dynamic system, comprising:

a processor; and logic instructions stored in a tangible computer-readable medium coupled to the processor which, when executed by the processor, configure the processor to:

receive first parameter data from a first sensor;

receive second parameter data from a second sensor;

generate a latency compensation adjustment parameter corresponding to the second parameter data based on additional parameter data received from an additional sensor and based on a model of latency effects; and generate filtered parameters based on the first parameter data, the second parameter data, and the latency compensation adjustment parameter.

9. The system of claim 8, wherein the additional parameter data includes a ground speed, an orientation, a cross-runway velocity, or a combination thereof.

10. The computer-based system of claim 8, wherein the filtered parameters are generated at a combining filter in the processor.

11. The computer-based system of claim 8, further comprising logic instructions stored in the tangible computer-readable medium which, when executed by the processor, configure the processor to:

generate a latency estimate based on the first parameter data, the second parameter data, and the latency compensation adjustment parameter; and update the model of latency effects based on the latency estimate.

12. The computer-based system of claim 8, further comprising logic instructions stored in the tangible computer-readable medium which, when executed by the processor, configure the processor to generate a sensor error estimate for the second sensor.

13. The computer-based system of claim 8, wherein the model of latency effects is constructed to compensate for position-based differences in motion over time between the first sensor and the second sensor.

14. The computer-based system of claim 8, wherein the first sensor comprises an inertial measuring system.

15. A non-transitory computer-readable medium comprising instructions which, when executed by a processor, configure the processor to:

receive first parameter data from a first sensor;

receive second parameter data from a second sensor; generate a latency compensation adjustment parameter associated with the second parameter data based on additional parameter data received from an additional sensor and based on a model of latency effects; and generate filtered parameters based on the first parameter data, the second parameter data, and the latency compensation adjustment parameter.

16. The non-transitory computer-readable medium of claim 15, wherein the additional parameter data includes a ground speed, an orientation, a cross-runway velocity, or a combination thereof.

17. The non-transitory computer-readable medium of claim 15, wherein the filtered parameters are generated at a combining filter in the processor.

18. The non-transitory computer-readable medium of claim 15, further comprising instructions which, when executed by the processor, configure the processor to:

generate a latency estimate based on the first parameter data, the second parameter data, and the latency compensation adjustment parameter; and update the model of latency effects based on the latency estimate.

19. The non-transitory computer-readable medium of claim 15, further comprising instructions which, when executed by the processor, configure the processor to generate a sensor error estimate for the second sensor.

20. The non-transitory computer-readable medium of claim 15, wherein the model of latency effects compensates for position-based differences in motion over time between the first sensor and the second sensor.

21. The non-transitory computer-readable medium of claim 15, wherein:

the first sensor comprises an inertial measuring system; and the second sensor comprises a global positioning system (GPS) based measuring system.

* * * * *